(12) United States Patent
Benedetti et al.

(10) Patent No.: US 12,340,715 B2
(45) Date of Patent: Jun. 24, 2025

(54) LABEL STRUCTURE FOR A PRODUCT ITEM

(71) Applicant: ABB S.p.A., Milan (IT)

(72) Inventors: Pierceleste Benedetti, Orsenigo (IT); Giuseppe Nava, Ponto Lambro (IT)

(73) Assignee: ABB S.p.A., Milan (IT)

( * ) Notice: Subject to any disclaimer, the term of this patent is extended or adjusted under 35 U.S.C. 154(b) by 116 days.

(21) Appl. No.: 17/908,950

(22) PCT Filed: Mar. 6, 2020

(86) PCT No.: PCT/EP2020/056076
§ 371 (c)(1),
(2) Date: Sep. 2, 2022

(87) PCT Pub. No.: WO2021/175445
PCT Pub. Date: Sep. 10, 2021

(65) Prior Publication Data
US 2023/0088556 A1    Mar. 23, 2023

(51) Int. Cl.
*G06K 19/06* (2006.01)
*G09F 3/00* (2006.01)
*G09F 3/02* (2006.01)

(52) U.S. Cl.
CPC ..... *G09F 3/0294* (2013.01); *G06K 19/06159* (2013.01); *G06K 19/06037* (2013.01); *G09F 2003/0257* (2013.01)

(58) Field of Classification Search
CPC .................................................... G09F 3/0294
(Continued)

(56) References Cited

U.S. PATENT DOCUMENTS

| 2008/0232427 A1* | 9/2008 | Leute | G01K 3/005 374/161 |
|---|---|---|---|
| 2010/0245044 A1 | 9/2010 | Dietemann | |

(Continued)

FOREIGN PATENT DOCUMENTS

| CN | 103462813 A | 12/2013 |
|---|---|---|
| CN | 103523313 A | 1/2014 |

(Continued)

OTHER PUBLICATIONS

International Search Report and Written Opinion for corresponding International App. No. PCT/EP2020/056076, mailed Nov. 5, 2020, 12 pages.

(Continued)

*Primary Examiner* — Daniel St Cyr
(74) *Attorney, Agent, or Firm* — McCarter & English, LLP

(57) ABSTRACT

Provided herein is a label structure for tagging a product item. The label structure includes a first graphic pattern having a first number of pixels and printed on a first portion of the label structure; a second graphic pattern having a second number of pixels and printed on a second portion of the label structure, the second graphic pattern forming an optical code readable by an optical decoding device; and shielding means capable of hiding or making visible the first graphic pattern depending on the values taken by a physical quantity to which the label structure is exposed. The first and second graphic patterns can be observed in combination, when the first graphic pattern is made visible by the shielding means.

19 Claims, 10 Drawing Sheets

(58) Field of Classification Search
USPC .......................................................... 235/494
See application file for complete search history.

(56) References Cited

U.S. PATENT DOCUMENTS

| | | |
|---|---|---|
| 2015/0186764 A1 | 7/2015 | Nemet et al. |
| 2020/0005237 A1 | 1/2020 | Simons |
| 2020/0065738 A1 | 2/2020 | Allott et al. |
| 2022/0343125 A1* | 10/2022 | Nemet ..................... G01K 3/04 |

FOREIGN PATENT DOCUMENTS

| | | |
|---|---|---|
| CN | 207264421 U | 4/2018 |
| EP | 1972913 A1 | 9/2008 |
| JP | 6-282962 A | 10/1994 |
| JP | 2002-014556 A | 1/2002 |
| JP | 2006-133190 A | 5/2006 |
| WO | 2019079007 A1 | 4/2019 |

OTHER PUBLICATIONS

Chinese Office Action for Application No. 202080098030.4, dated Oct. 28, 2024, 32 pages.

\* cited by examiner

LABEL STRUCTURE FOR A PRODUCT ITEM

CROSS-REFERENCE TO RELATED APPLICATIONS

The present application is a National Stage entry of International Application No. PCT/EP2020/056076, filed Mar. 6, 2020, the contents of which are incorporated by reference in its entirety.

BACKGROUND

The present disclosure relates to a label structure for a product item, in particular for an electric product item.

As is known, electric products to be used in electric power distribution grids or other electric systems may be exposed to rough environmental conditions during transportation or their operating life, which may compromise their safety and reliability. For example, the exposure to excessive environmental temperatures during transportation may deteriorate the quality of some materials (e.g. plastic materials) or electrical connections, thereby leading to severe failures that are generally difficult to prevent or track.

A solution to deal with this issue would be monitoring the environmental conditions of an electric product through suitable monitoring systems.

However, this approach may be quite difficult to implement in practice and it generally entails a relevant increase of the industrial costs of an electric product.

In the state of the art, there are known temperature tracking labels used for tagging an electric product item in such a way to obtain information about the temperature history of this latter.

Such tracking labels generally employ pads including thermochromic materials capable of changing their colour upon reaching a characteristic transition temperature.

Label structures of this type do not generally allow an automatic detection of the information related to the temperature history of the product item, on which they are applied.

In addition, since the colour change can be recognized with the naked eye, they do not allow to keep such an information confidential, which would be quite advantageous for equipment suppliers.

It is apparent from the above how, in the state of the art, it is quite felt the need for innovative technical solutions capable of overcoming or mitigating the technical issues described above.

BRIEF DESCRIPTION

In order to respond to this need, the present disclosure provides a label structure.

In a general definition, the label structure, according to the disclosure, includes:
- a first graphic pattern having a first number of pixels and printed on a first portion of the label structure;
- a second graphic pattern having a second number of pixels and printed on a second portion of the label structure, the second graphic pattern forming an optical code readable by an optical decoding device;
- shielding means capable of hiding or making visible the first graphic pattern depending on the values taken by a physical quantity (e.g. an environmental temperature) to which the label structure is exposed.

The first and second graphic patterns are observable in combination, when the first graphic pattern is made visible by the shielding means.

The combination of the first and second graphic patterns forms an optical code readable by an optical decoding device, when the first graphic pattern is made visible by the shielding means.

In some embodiments, the first number N1 of pixels of the first pattern is given by the following relation: $N1<0.3\ N2$, wherein N2 is the number of pixels of the second graphic pattern.

According to some embodiments of the disclosure, the shielding means are capable of hiding the first graphic pattern, when the label structure is exposed to the physical quantity having values lower than a first threshold value, and are capable of making visible the first graphic pattern, when the label structure is exposed to the physical quantity having values higher than or equal to the first threshold value.

According to some embodiments of the disclosure, the label structure includes also a third graphic pattern having a third number of pixels and printed on a third portion of the label structure.

The shielding means are capable of hiding the third graphic pattern, when the label structure is exposed to the physical quantity having values lower than a second threshold value higher than the first threshold value, and are capable of making visible the third graphic pattern when the label structure is exposed to the physical quantity having values higher than or equal to the second threshold value.

The first, second and third graphic patterns are observable in combination, when the first and third graphic patterns are made visible by the shielding means.

The combination of the first, second and third graphic patterns forms an optical code readable by an optical decoding device, when the first and third graphic patterns are made visible by the shielding means.

In some embodiments, the third number N3 of pixels of the third graphic pattern is given by the following relation: $N3<0.3\ N2$, wherein N2 is the number of pixels of the second graphic pattern.

According to some embodiments of the disclosure, the layer structure includes:
- a first layer of printable material including a first region on which the first graphic pattern is printed;
- a second layer of printable material including a second region, on which the second graphic pattern is printed, the second layer of printable material being overlapped with the first layer of printable material, the second layer of printable material being made of a transparent material or including a first opening overlapped with the first region of the first layer of printable material, on which the first graphic pattern is printed.

The shielding means include a first shielding material interposed between the first and second layers of printable material and covering the first region of the first layer of printable material on which the first graphic pattern is printed.

The first shielding material takes an opacity condition, thereby hiding the first graphic pattern, when the label structure is exposed to the physical quantity having values lower than a first threshold value.

The first shielding material takes a transparency condition, thereby making visible the first graphic pattern, when the label structure is exposed to the physical quantity having values higher than or equal to the first threshold value.

According to some embodiments of the disclosure, the first layer of printable material includes also a third region, on which the third graphic pattern is printed.

The second layer of printable material is overlapped with the first layer of printable material and it is made of a transparent material or it includes also a second opening overlapped with the third region of the first layer of printable material, on which the third graphic pattern is printed.

The shielding means include also a second shielding material interposed between the first and second layers of printable material and covering the second region of the first layer of printable material on which the third graphic pattern is printed.

The second shielding material takes an opacity condition, thereby hiding the third graphic pattern, when the label structure is exposed to the physical quantity having values lower than the second threshold value.

The second shielding material takes a transparency condition, thereby making visible the third graphic pattern, when the label structure is exposed to the physical quantity having values higher than or equal to the second threshold value.

According to some embodiments of the disclosure, the layer structure includes:
- a first layer of printable material including a first region on which the first graphic pattern is printed;
- a second layer of printable material including a second region, on which the second graphic pattern is printed, the second layer of printable material being overlapped with the first layer of printable material, the second layer of printable material being made of a transparent material or including a first opening overlapped with the first region of the first layer of printable material, on which the first graphic pattern is printed;
- at least a SMA arrangement including at least a shielding portion interposed between the first and second layers of printable material and having a size or shape changeable depending on the values taken by the physical quantity.

The shielding means include the at least a shield portion.

The at least a shielding portion covers the first region of the first layer of printable material, thereby hiding the first graphic pattern, when the label structure is exposed to the physical quantity having values lower than the first threshold value.

The at least a shielding portion leaves uncovered the first region of the first layer of printable material, thereby making visible the first graphic pattern, when the label structure is exposed to the physical quantity having values higher than or equal to the first threshold value.

According to some embodiments of the disclosure, the first layer of printable material includes also a third region, on which the third graphic pattern is printed.

The second layer of printable material is overlapped with the first layer of printable material and it is made of a transparent material or it includes also a second opening overlapped with the third region of the first layer of printable material, on which the third graphic pattern is printed, The at least a shielding portion covers the third region of the first layer of printable material, thereby hiding the third graphic pattern, when the label structure is exposed to the physical quantity having values lower than the second threshold value.

The at least a shielding portion leaves uncovered the third region of the first layer of printable material, thereby making visible the third graphic pattern, when the label structure is exposed to the physical quantity having values higher than or equal to the second threshold value.

According to some embodiments of the disclosure, the shielding means are capable of making visible the first graphic pattern, when the label structure is exposed to the physical quantity having values lower than a first threshold value, and they are capable of hiding the first graphic pattern, when the label structure is exposed to the physical quantity having values higher than or equal to the first threshold value.

According to some embodiments of the disclosure, the label structure includes also a third graphic pattern having a third number of pixels and printed on a third portion of the label structure.

The shielding means are capable of making visible the third graphic pattern, when the label structure is exposed to the physical quantity having values lower than a second threshold value higher than the first threshold value, and they are capable of hiding the third graphic pattern when the label structure is exposed to the physical quantity having values higher than or equal to the second threshold value.

The first, second and third graphic patterns are observable in combination, when the first and third graphic patterns are made visible by the shielding means.

The combination of the first, second and third graphic patterns forms an optical code readable by an optical decoding device, when the first and third graphic patterns are made visible by the shielding means.

In some embodiments, the third number N3 of pixels of the third graphic pattern is given by the following relation: $N3 < 0.3\ N2$, wherein N2 is the number of pixels of the second graphic pattern.

According to some embodiments of the disclosure, the layer structure includes:
- a first layer of printable material including a first region on which the first graphic pattern is printed;
- a second layer of printable material including a second region, on which the second graphic pattern is printed, the second layer of printable material being overlapped with the first layer of printable material, the second layer of printable material being made of a transparent material or including a first opening overlapped with the first region of the first layer of printable material, on which the first graphic pattern is printed.

The shielding means include a first shielding material interposed between the first and second layers of printable material and covering the first region of the first layer of printable material on which the first graphic pattern is printed.

The first shielding material takes a transparency condition, thereby making visible the first graphic pattern, when the label structure is exposed to the physical quantity having values lower than a first threshold value.

The first shielding material takes an opacity condition, thereby hiding the first graphic pattern, when the label structure is exposed to the physical quantity having values higher than or equal to the first threshold value.

According to some embodiments of the disclosure, the first layer of printable material includes also a third region, on which the third graphic pattern is printed.

The second layer of printable material is overlapped with the first layer of printable material and it is made of a transparent material or it includes also a second opening overlapped with the third region of the first layer of printable material, on which the third graphic pattern is printed.

The shielding means include also a second shielding material interposed between the first and second layers of printable material and covering the second region of the first layer of printable material on which the third graphic pattern is printed.

The second shielding material takes a transparency condition, thereby making visible the third graphic pattern, when the label structure is exposed to the physical quantity having values lower than the second threshold value.

The second shielding material takes an opacity condition, thereby hiding the third graphic pattern, when the label structure is exposed to the physical quantity having values higher than or equal to the second threshold value.

According to some embodiments of the disclosure, the layer structure includes:
- a first layer of printable material including a first region on which the first graphic pattern is printed;
- a second layer of printable material including a second region, on which the second graphic pattern is printed, the second layer of printable material being overlapped with the first layer of printable material, the second layer of printable material being made of a transparent material or including a first opening overlapped with the first region of the first layer of printable material, on which the first graphic pattern is printed;
- at least a SMA arrangement including at least a shielding portion interposed between the first and second layers of printable material and having a size or shape changeable depending on the values taken by the physical quantity.

The shielding means include the at least a shield portion.

The at least a shielding portion leaves uncovered the first region of the first layer of printable material, thereby making visible the first graphic pattern, when the label structure is exposed to the physical quantity having values lower than the first threshold value.

The at least a shielding portion covers the first region of the first layer of printable material, thereby hiding the first graphic pattern, when the label structure is exposed to the physical quantity having values higher than or equal to the first threshold value.

According to some embodiments of the disclosure, the first layer of printable material includes also a third region, on which the third graphic pattern is printed.

The second layer of printable material is overlapped with the first layer of printable material and is made of a transparent material or it includes also a second opening overlapped with the third region of the first layer of printable material, on which the third graphic pattern is printed, The at least a shielding portion leaves uncovered the third region of the first layer of printable material, thereby making visible the third graphic pattern, when the label structure is exposed to the physical quantity having values lower than the second threshold value.

The at least a shielding portion covers the third region of the first layer of printable material, thereby hiding the third graphic pattern, when the label structure is exposed to the physical quantity having values higher than or equal to the second threshold value.

BRIEF DESCRIPTION OF THE DRAWINGS

Further characteristics and advantages of the disclosure will emerge from the description of example embodiments of the control unit, according to the disclosure, non-limiting examples of which are provided in the attached drawings, wherein.

DETAILED DESCRIPTION

Figure 1:
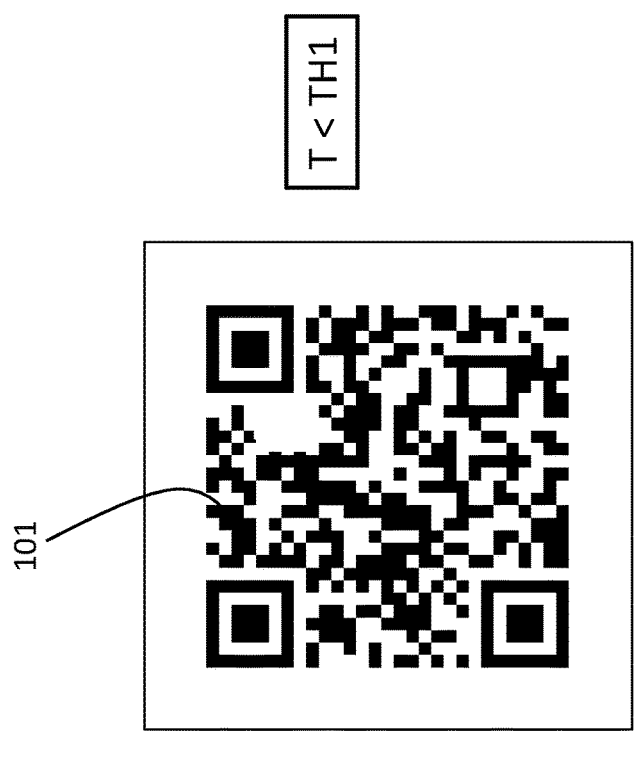
FIGS. 1-3 are schematic views showing operation of a label structure, according to some embodiments of the disclosure.

With reference to the figures, the present disclosure relates to a label structure 1 for tagging a product item.

The label structure 1 is particularly useful for use in electric products to be used in electric power distribution grids or other electric systems. As an example, it is particularly adapted for tagging the cabinet of an electric switchgear.

However, the label structure 1, according to the disclosure, may be conveniently used for tagging products of different type, e.g. consumer products, food products, pharmaceutical products, chemical products, packages, containers, envelopes, and so on.

According to the disclosure, the label structure 1 includes a first graphic pattern 101 printed on a first portion 11, 111 of the label structure 1.

The first graphic pattern 101 is printed on a bi-dimensional surface and it is formed by a set of pixels, including a first number N1 of pixels.

Each pixel is conveniently formed by a small area coloured with a suitable permanent ink, which may be of known type.

The first graphic pattern 101 may be conveniently printed on a printable material (e.g. paper, polypropylene or plastic films) by using printing techniques of known type (e.g. digital printing techniques, silkscreen printing techniques, or the like).

In some embodiments, the first graphic pattern 101 does not form, per se, an optical code readable by an optical decoding device. As an example, the first graphic patterns 101, as such, does not form a QR-code or a bar-code readable by a traditional optical decoding device. However, the first graphic pattern 101 may be conveniently configured as a small portion of an optical code.

According to the disclosure, the label structure 1 includes a second graphic pattern 102 printed on a second portion 12, 120 of the label structure 1.

Also, the second graphic pattern 102 is printed on a bi-dimensional surface and it is formed by a set of pixels, including a second number N2 of pixels.

The second graphic pattern 102 may be conveniently printed by using printing techniques of known type, which will not here described for the sake of brevity.

According to the disclosure, the second graphic pattern 102 forms an optical code readable by an optical decoding device.

In some embodiments, the second graphic patterns 102 is configured as a QR-code or a bar-code readable by a traditional optical decoding device.

According to the disclosure, the label structure 1 includes shielding means 3 capable of hiding or making visible the first graphic pattern 101 depending on the values taken by a physical quantity T to which the label structure is exposed.

As it will be apparent from the following, according to some embodiments of the disclosure (FIGS. 4-5), such shielding means may include a shielding material 3A capable of changing its optical properties as a function of the above-mentioned physical quantity T.

According to other embodiments of the disclosure (FIGS. 6-7), such shielding means may include a shielding portion 3C of a SMA (Shape Memory Alloy) arrangement 14, which is capable of changing its geometric configuration (e.g. size or shape) as a function of the values taken by the physical quantity T.

In some embodiments, the above-mentioned physical quantity is an environmental temperature T, to which the label structure 1 is exposed.

In general, however, the physical quantity T may be of different type, such as a magnetic field, humidity, a mechanical vibration, a light radiation, a chemical substance, a biological substance, and the like.

According to the disclosure, the first and second graphic patterns 101, 102 are arranged in such a way that they can be observed in combination, when the first graphic pattern 101 is made visible by the shielding means 3.

As it will be apparent from the following, according to example embodiments of the disclosure (FIGS. 4-7), the first and second graphic patterns 101, 102 may be conveniently printed on overlapped layers 11, 12 of printable material.

According to the disclosure, when the first graphic pattern 101 is made visible by the shielding means 3, the combination of the first and second graphic patterns 101, 102 is configured as an optical code readable by an optical decoding device.

In some embodiments, the first and second graphic patterns 101, 102 form a QR-code or a bar-code readable by a traditional optical decoding device, when the first graphic pattern 101 is made visible by the shielding means 3.

Thanks to the arrangement of the first and second graphic patterns 101, 102 as described above in combination with the shielding means 3 capable of selectively hiding or making visible the graphic pattern 101 depending on the values taken by the physical quantity T, the label structure 1 allows a simple and automatic detection of the information related to the exposure history to the physical quantity T.

Such an information may, in fact, be detected together with other standard information related to the product item (e.g. general-purpose technical information), which is coded by the second graphic pattern 102 as such, by using an optical code reading process, such as a QR-code reading process.

The label structure 1 thus provides relevant advantages in terms of easiness and reliability of use.

In addition, the label structure 1 can be directly interfaced with computerized arrangements capable of processing the information provided by the above-mentioned first and second graphic patterns 101 and 102.

According to example embodiments of the disclosure, the first number N1 of pixels of the first graphic pattern 101 is correlated to the number N2 of pixels of the second graphic pattern 102.

In particular, the first number N1 of pixels of the first graphic pattern 101 is given by the following relation: N1<0.3 N2, wherein N2 is the number of pixels of the second graphic pattern 102.

This solution is quite advantageous as it allows implementing a selective access to the information related to the exposure history of the label structure 1 to the above-mentioned physical quantity T.

Being the first number N1 of pixels of the first graphic pattern 101 very smaller than the second number N2 of pixels of the second graphic pattern 102, the information graphic pattern 101 (when made visible by the shielding means 3) cannot be distinguished from the second graphic pattern 102, when the combination of the first and second graphic patterns is read through a standard optical decoding device, for example a traditional QR-reading optical device.

Instead, the first graphic pattern 101 (when made visible by the shielding means 3) can be distinguished from the second graphic pattern 102 by reading and processing the combination of the first and second graphic patterns through an optical decoding device employing a suitable computerised image recognition tool, which may be of known type (e.g. a Phyton™ image recognition tool).

In this way, selected personnel, using a suitably configured optical decoding device provided with an image recognition tool to read the label structure 1, will be able to decode the first graphic pattern 101 (when this latter is made visible by the shielding means 3), thereby acquiring the information related to the exposure history to the physical quantity T.

On the other hand, generic personnel using a standard optical decoding device to read the label structure 1 will not be able to decode the first graphic pattern 101 (when this latter is made visible by the above-mentioned shielding means), thereby being unable to access to the information related to the exposure history to the physical quantity T.

It is evident how the above-mentioned particular arrangement of the first graphic pattern 101 allows maintaining confidential the information content provided by the first graphic pattern.

FIRST FAMILY OF EMBODIMENTS OF THE DISCLOSURE

According to a first family of embodiments of the disclosure (which will be better described in the following), the shielding means 3 are capable of hiding the first graphic pattern 101, when the label structure 1 is exposed to a physical quantity T having values lower than a first threshold value TH1, and they are capable of making visible the first graphic pattern 101, when the label structure 1 is exposed to a physical quantity T having values higher than or equal to the first threshold value TH1.

As an example, when the physical quantity T is an environmental temperature and the product item is an electric product, the first threshold value TH1 may be 70° C.

According to some variants of these embodiments of the disclosure (which will be better described in the following), the label structure 1 includes an additional graphic pattern 103 for providing additional information related to the historical exposure to the physical quantity T.

In some embodiments, the label structure 1 includes a third graphic pattern 103 printed on a third portion 113 of the label structure.

The third graphic pattern 103 is conveniently printed on a bi-dimensional surface and it is formed by a set of pixels including a third number N3 of pixels.

The third graphic pattern 103 may be conveniently printed on a printable material by using printing techniques of known type.

In some embodiments, the third graphic pattern 103 does not form, per se, an optical code readable by an optical decoding device as the first graphic pattern 101.

In some embodiments, the shielding means 3 are capable of hiding the third graphic pattern 103, when the label structure is exposed to a physical quantity T having values lower than a second threshold value TH2 higher than the first threshold value TH1, and they are capable of making visible also the third graphic pattern 103, when the label structure 1 is exposed to a physical quantity T having values higher than or equal to the second threshold value TH2.

As an example, when the physical quantity T is an environmental temperature and the product item is an electric product, the second threshold value TH2 may be 110° C.

In some embodiments, the second and third graphic patterns 102, 103 are arranged in such a way that they can be observed in combination, when the third graphic pattern 103 is made visible by the shielding means 3.

As it will be apparent from the following, according to example embodiments of the disclosure (FIGS. 5 and 7), the second and third graphic patterns 102, 103 may be conveniently printed on overlapped layers 11, 12 of printable material.

In some embodiments, when the first and third graphic patterns 101, 103 are made visible by the shielding means 3, the combination of the first, second and third graphic patterns 101, 102, 103 forms an optical code readable by an optical decoding device.

In some embodiments, the first, second and third graphic patterns 101, 102, 103 form a QR-code or a bar-code readable by a traditional optical decoding device, when the first and third graphic patterns 101, 102 are made visible by the above-mentioned shielding means.

As illustrated above, this arrangement of the graphic patterns 101, 102, 103 in combination with the shielding means 3 capable of selectively hiding or making visible the graphic patterns 101, 103 allows a simple and automatic detection of the information related to the exposure history to the physical quantity T.

In some embodiments, also the third number N3 of pixels of the third graphic pattern 103 is correlated to the number N2 of pixels of the second graphic pattern 102.

In particular, the third number N3 of pixels of the third graphic pattern 103 is given by the following relation: N3<0.3 N2, wherein N2 is the number of pixels of the second graphic pattern 102.

As illustrated above, this solution is quite advantageous as it allows implementing a selective access to the information related to the exposure history of the label structure to the above-mentioned physical quantity T.

The general operation of a label structure 1, according to an embodiment included in the above-mentioned first family of embodiments of the disclosure, is briefly described with reference to FIGS. 1-3.

The label structure 1 is supposed to include a first graphic pattern 101, a second graphic pattern 102 (which is conveniently configured as a QR-code) and a third graphic pattern 103.

The label structure 1 is also supposed to be attached to a product item (not shown) and to be exposed to a physical quantity T, for example an environmental temperature.

FIG. 1 shows the operating condition of label structure 1, when the mentioned physical quantity T takes values lower than a first threshold value TH1.

As it is possible to notice, the first and third graphic patterns 101, 103 are not visible as they are hidden by the shielding means (not shown). Thus, only the second graphic pattern 102 can be observed and possibly read through an optical decoding device.

Obviously, the absence of the first and third graphic patterns 101, 103 is indicative of the circumstance that the physical quantity T, to which the label structure 1 and, consequently, the product item have been exposed, has always taken values lower than the first threshold value TH1 (and the second threshold value TH2).

Figure 2:
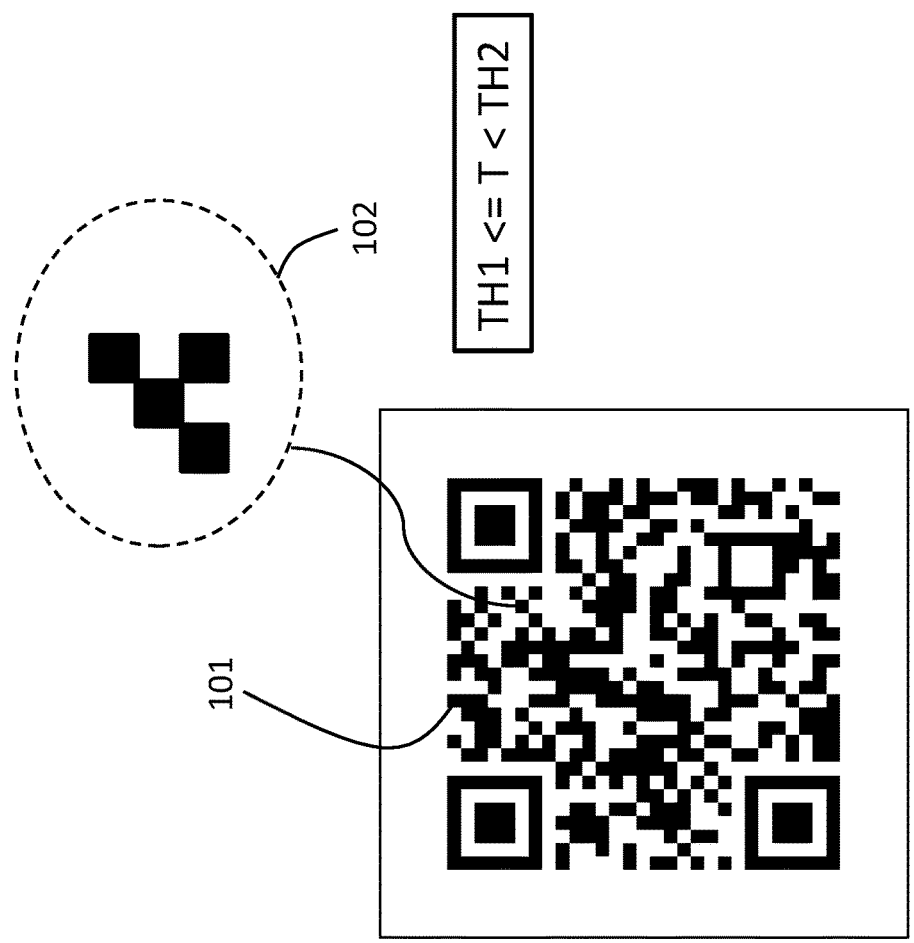

FIG. 2 shows the operating condition of label structure 1, when the mentioned physical quantity T takes values higher or equal than the first threshold value TH1.

In this case, the first graphic pattern 101 is made visible by the above-mentioned shielding means (not shown) while the third graphic pattern 103 is still hidden.

The combination of the first and second graphic patterns 101, 102 can now be observed. Conveniently, such a combination of graphic patterns is still configured as a QR-code and it can be read through an optical decoding device.

The presence of the first graphic pattern 101 is thus indicative of the circumstance that the physical quantity T, to which the label structure 1 and, consequently, the product item have been exposed, has taken at least once values higher than or equal to the first threshold value TH1.

On the other hand, the absence of the third graphic pattern 103 is indicative of the circumstance that the physical quantity T, to which the product item has been exposed, has always taken values lower than the second threshold value TH2.

Figure 3:
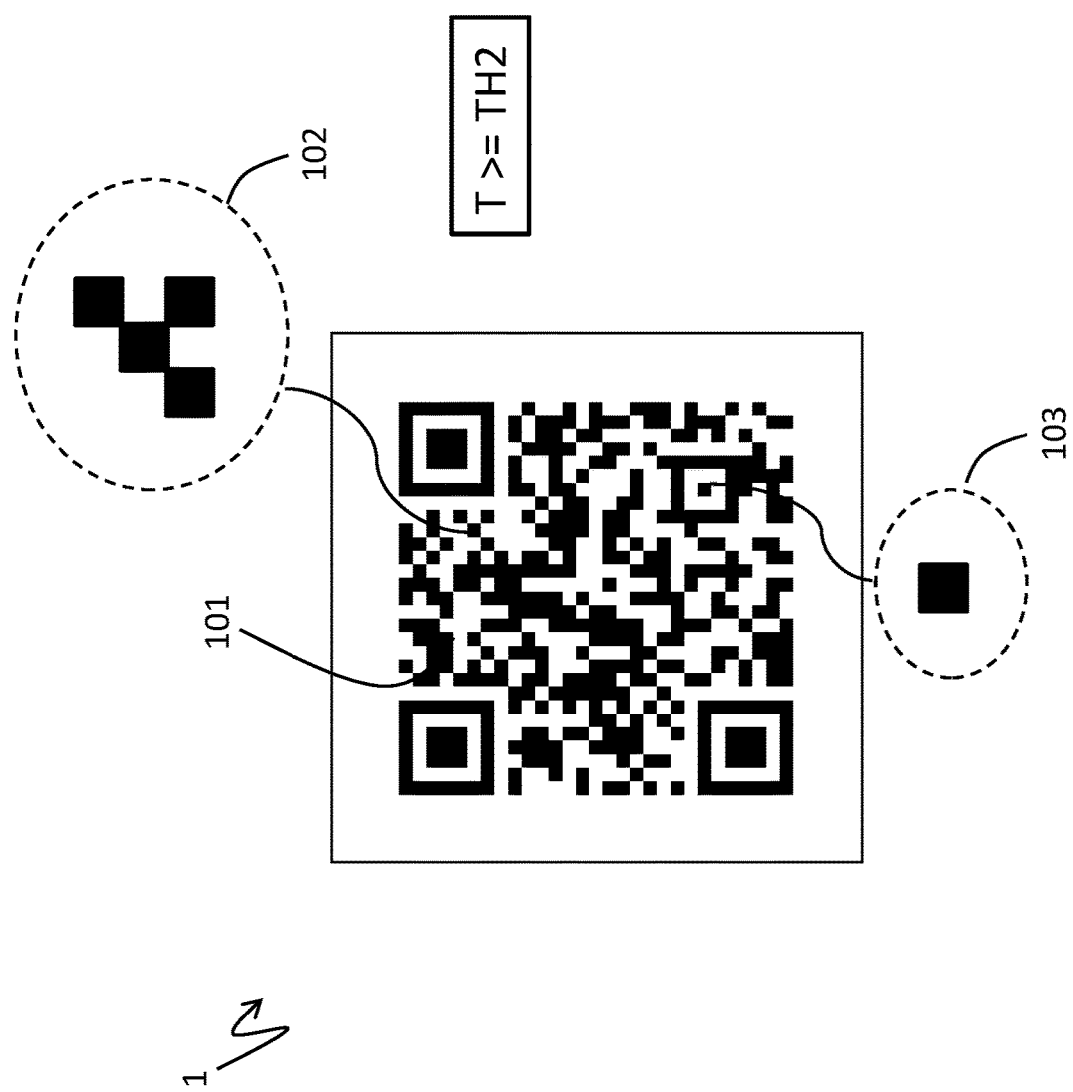

FIG. 3 shows the operating condition of label structure 1, when the mentioned physical quantity T takes values higher than or equal to a second threshold value TH2, with TH2>TH1.

In this case, both the first and third graphic patterns 101, 103 are made visible by the above-mentioned shielding means (not shown).

The combination of the first, second and third graphic patterns 101, 102, 103 can now be observed. Conveniently, such a combination of graphic patterns is still configured as a QR-code and it can be read through an optical decoding device.

The presence of both the first and third graphic patterns 101, 103 is thus indicative of the circumstance that the physical quantity T, to which the label structure 1 and, consequently, the product item have been exposed, has taken at least once values higher than or equal to the second threshold value TH2.

As it is possible to notice, both the first and third graphic patterns 101, 103 have a number of pixels very smaller than the number of pixels of the second graphic pattern 102.

These graphic patterns (when made visible by the shielding means 3) cannot be distinguished from the second graphic pattern 102, when the combination of the graphic patterns is read by a standard optical decoding device, for example a traditional QR-reading optical device.

Instead, the first and third graphic patterns 101, 103 (when made visible by the shielding means 3) can be distinguished from the second graphic pattern 102 by reading the combination of the graphic patterns through an optical decoding device provided by an image recognition tool. The access to the information content brought by the first and third graphic patterns 101, 103 can thus be easily reserved to selected personnel only.

Embodiment #1

Figure 4:
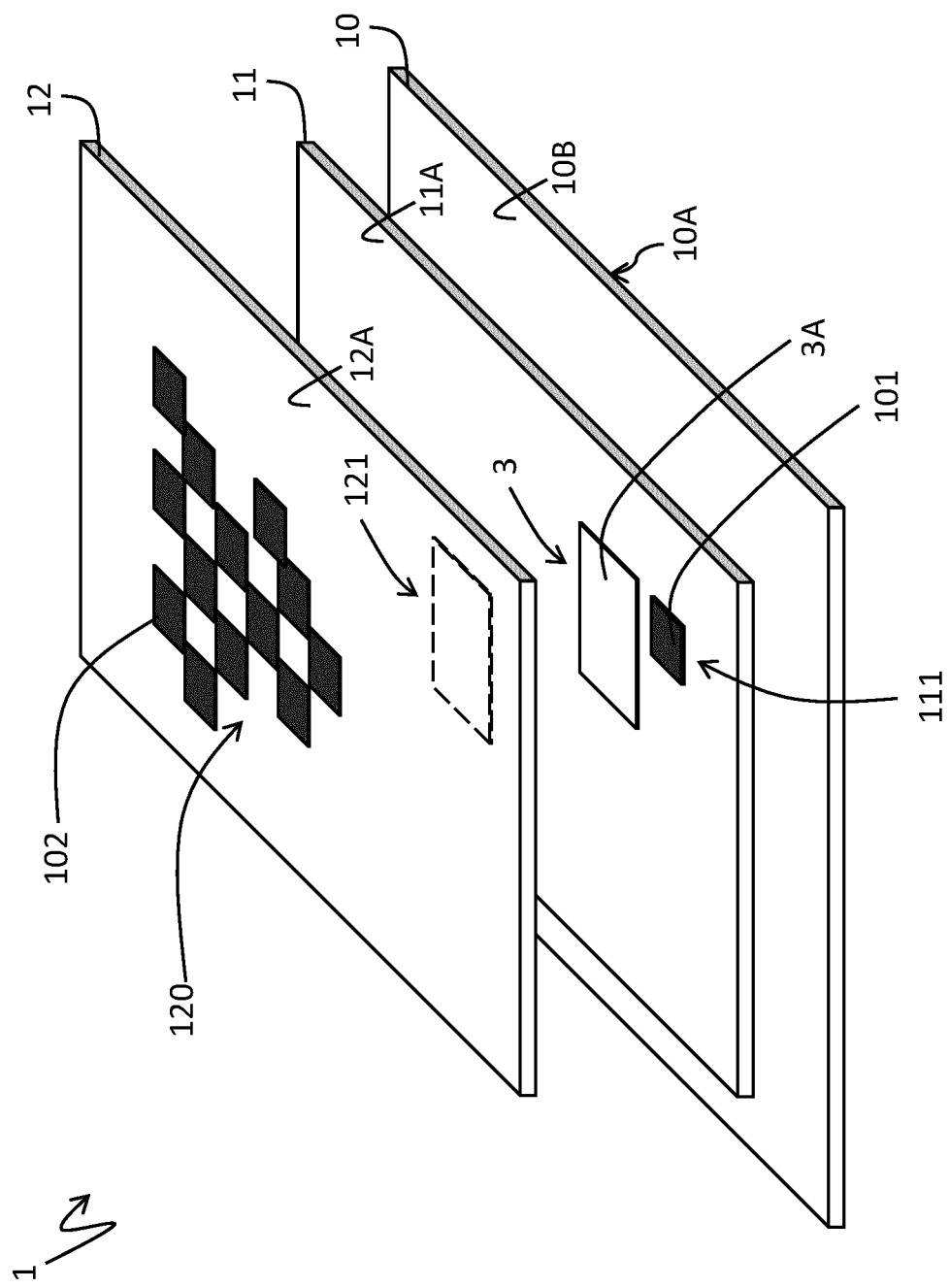
FIGS. 4-7 are schematic views showing the structure of a label structure, according to a variety of embodiments of the disclosure.

Referring to FIG. 4, the label structure 1, according to an embodiment included in the above-mentioned first family of embodiments of the disclosure, is now described in more details.

According to such an embodiment of the disclosure, the label structure 1 includes only the graphic patterns 101, 102 and a stack of overlapped layers on which these graphic patterns and the corresponding shielding means 3 are arranged.

In some embodiments, the label structure 1 includes a substrate layer 10 (for example made of example paper, polypropylene or plastic films) having opposite first and second surfaces 10A, 10B.

The first surface 10A of the substrate layer 10 is intended to be attached on a surface of a product item, when the label structure 1 is applied to the product item.

To this aim, the first surface 10A of the substrate layer 10 may be conveniently covered with an adhesive material (not shown) of known type. In turn, this latter may be covered by a removable protective film (not shown) of known type.

The opposite second surface 10B of the substrate layer 10 is intended to support the remaining structural elements of the label structure 1.

The second surface 10B of the substrate layer may be conveniently covered by a suitable paint (not shown), for example a white paint, in such a way to form a suitable background for the graphic patterns 101, 102 of the label structure 1.

In some embodiments, the label structure 1 includes a first layer 11 of printable material, for example paper, polypropylene or plastic films.

Conveniently, the first layer 11 of printable material is intended to be overlapped to the substrate layer 10, at the second surface 10B of this latter.

The first layer 11 includes a first region 111 on which the first graphic pattern 101 is printed. Conveniently, the first region 111 is located at a surface 11A of the first layer 11 in distal position with respect to the substrate layer 10.

In some embodiments, the label structure 1 includes a second layer 12 of printable material (for example paper, polypropylene or plastic films), which is intended to be overlapped with the first layer 111 of printable material, at the second surface 11A of this latter.

The second layer 12 includes a second region 120 on which the second graphic pattern 102 (configured as a code readable through an optical decoding device) is printed.

Conveniently, the second region 120 of the second layer 12 is located at a surface 12A of this latter in distal position with respect to the substrate layer 10.

According to some variants of the disclosure, the second layer 12 may be made of a transparent material (for example paper, polypropylene or plastic films.

As an alternative, the second layer 12 may be formed by an opaque material (for example paper, polypropylene or plastic films) but it includes a first pass-through opening 121 overlapped with the first region 111 of the first layer 11 of printable material, on which the first graphic pattern 101 is printed.

According to this embodiment of the disclosure, the label structure 1 includes a first shielding material 3A interposed between the first and second layers 11, 12 of printable material and covering at least the first region 111 of the first layer 11 of printable material on which the first graphic pattern 101 is printed.

The first shielding material 3A (for example including a thermochromic material such as a Ceresine wax) forms the shielding means 3 according to the disclosure.

Conveniently, the first shielding material 3A takes an opacity condition (e.g. to the visible light), when the label structure 1 is exposed to a physical quantity T (for example an environmental temperature) having values lower than a first threshold value TH1.

When it takes such an opacity condition, the first shielding material 3A hides the first graphic pattern 101, which cannot therefore be observed.

Conveniently, the first shielding material 3A takes a transparency condition (e.g. to the visible light), when the label structure 1 is exposed to a physical quantity T (for example an environmental temperature) having values equal to or higher than the first threshold value TH1.

When it takes such a transparency condition, the first shielding material 3A makes visible the first graphic pattern 101, which can therefore be observed.

Thanks to the circumstance that the second layer 12 is made of a transparent material or that the second layer 12 includes the first aperture 121, the combination of the first and second graphic patterns 101, 102 can now be observed.

Such a combination of graphic patterns is still configured as a code readable through an optical decoding device.

Embodiment #2

Figure 5:
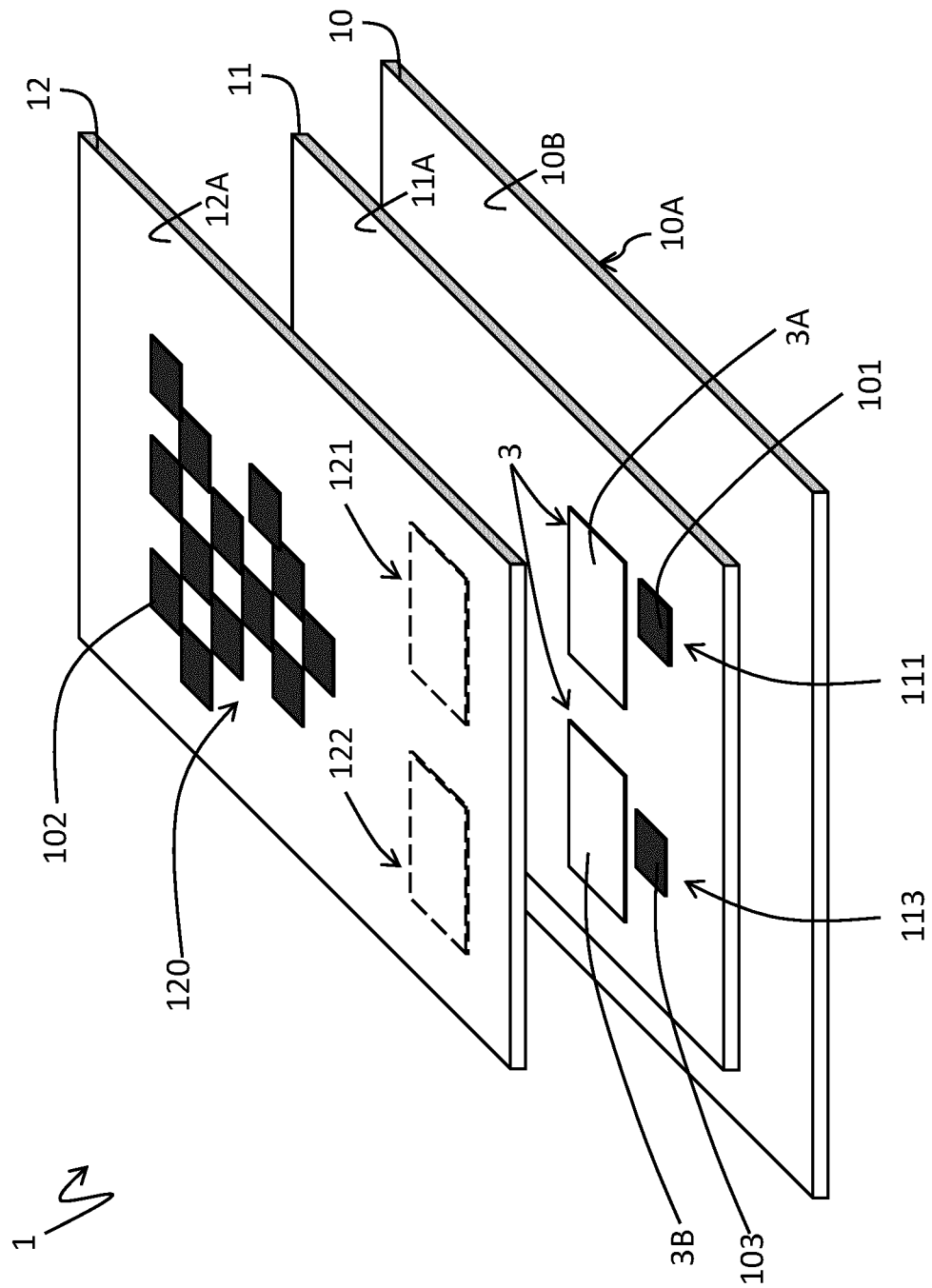

Referring to FIG. 5, the label structure 1, according to an embodiment included in the above-mentioned first family of embodiments of the disclosure, is now described in more details.

According to such an embodiment of the disclosure, the label structure 1 includes the graphic patterns 101, 102, 103 and a stack of overlapped layers on which these graphic patterns and the corresponding shielding means 3 are arranged.

In general, the label structure 1 is configured similarly to the above-mentioned embodiment #1 of the disclosure (FIG. 4).

According to this embodiment of the disclosure, the first layer 11 includes a first region 111, on which the first graphic pattern 101 is printed, and a third region 113, on which the third graphic pattern 103 is printed.

Conveniently, the first and third regions 111, 133 of the first layer 11 are located at a surface 11A of this latter in distal position with respect to the substrate layer 10.

According to this embodiment of the disclosure, the label structure 1 includes a second layer 12 of printable material that may be realized as in the above-mentioned embodiment #1 of the disclosure.

The second layer 12 includes a second region 120 on which the second graphic pattern 102 (configured as a code readable through an optical decoding device) is printed.

Conveniently, the second region 120 of the second layer 12 is located at a surface 12A of this latter in distal position with respect to the substrate layer 10.

According to some variants of the disclosure, the second layer 12 may be made of a transparent material as indicated above.

As an alternative, the second layer 12 may be formed by an opaque material as indicated above. In this case, the second layer 12 includes a first pass-through opening 121 and a second pass-through opening 122 respectively overlapped with the first region 111 and the third region 113 of the first layer 11 of printable material, on which the first graphic pattern 101 and the third graphic pattern 103 are printed.

According to this embodiment of the disclosure, the label structure 1 includes a first shielding material 3A interposed between the first and second layers 11, 12 of printable material and covering at least the first region 111 of the first layer 11 of printable material, on which the first graphic pattern 101 is printed.

According to this embodiment of the disclosure, the label structure 1 includes a second shielding material 3B interposed between the first and second layers 11, 12 of printable material and covering at least the third region 113 of the first layer 11 of printable material, on which the third graphic pattern 103 is printed.

The first and second shielding materials 3A, 3B (which may be realized as indicated above) form the shielding means 3 according to the disclosure.

Conveniently, the first shielding material 3A takes an opacity condition (e.g. to the visible light), when the label structure 1 is exposed to a physical quantity T (for example an environmental temperature) having values lower than a first threshold value TH1.

When it takes such an opacity condition, the first shielding material 3A hides the first graphic pattern 101, which cannot therefore be observed.

Conveniently, the third shielding material 3B takes an opacity condition (e.g. to the visible light), when the label structure 1 is exposed to a physical quantity T (for example an environmental temperature) having values lower than a second threshold value TH2 that is higher than the first threshold value TH1.

When it takes such an opacity condition, the second shielding material 3B hides the third graphic pattern 103, which cannot therefore be observed.

Conveniently, the first shielding material 3A takes a transparency condition (e.g. to the visible light), when the label structure 1 is exposed to a physical quantity T (for example an environmental temperature) having values equal to or higher than the first threshold value TH1.

When it takes such a transparency condition, the first shielding material 3A makes visible the first graphic pattern 101, which can therefore be observed in combination with the second graphic pattern 102 (thanks to the circumstance that the second layer 12 is made of a transparent material or it includes the first aperture 121).

Such a combination of graphic patterns is still configured as a code readable through an optical decoding device.

Obviously, in this condition, the second shielding material 3B is still hiding the third graphic pattern 103, which cannot therefore be observed.

Conveniently, the second shielding material 3B takes a transparency condition (e.g. to the visible light), when the label structure 1 is exposed to a physical quantity T (for example an environmental temperature) having values equal to or higher than the second threshold value TH2.

When it takes such a transparency condition, the first shielding material 3A makes visible the third graphic pattern 103, which can therefore be observed in combination with the first and second graphic patterns 101, 102 (thanks to the circumstance that the second layer 12 is made of a transparent material or it includes the first and second apertures 121 122).

Such a combination of graphic patterns is still configured as a code readable through an optical decoding device.

Embodiment #3

Figure 6:
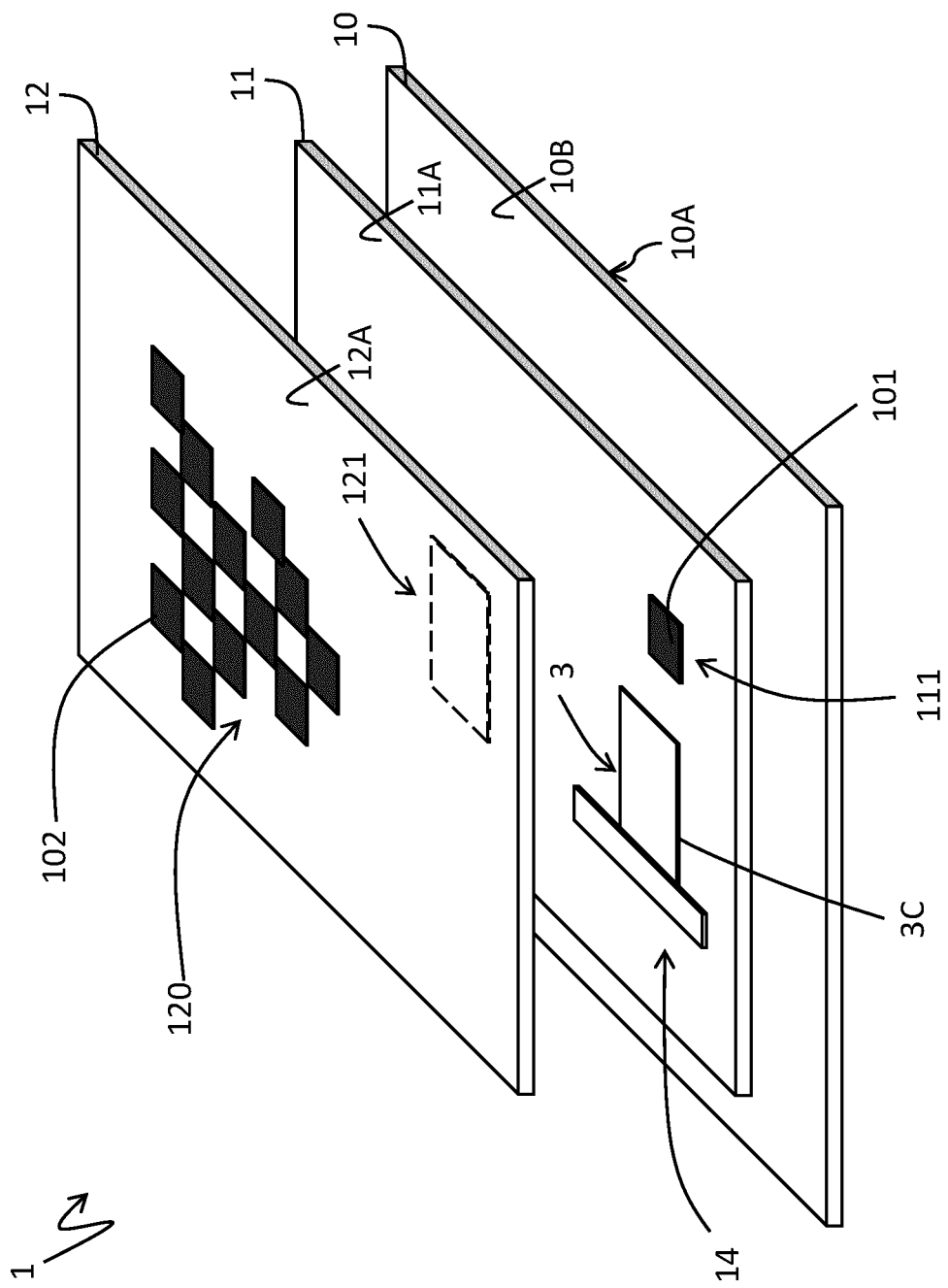

Referring to FIG. 6, the label structure 1, according to an embodiment included in the above-mentioned first family of embodiments of the disclosure, is now described in more details.

According to such an embodiment of the disclosure, the label structure 1 includes the graphic patterns 101, 102 and a stack of overlapped layers on which these graphic patterns and the corresponding shielding means 3 are arranged.

In general, the label structure 1 is configured as in the embodiment #1 of the disclosure (FIG. 4).

According to this embodiment of the disclosure, the label structure 1 includes a SMA (Shape Memory Alloy) arrangement 14.

The SMA arrangement (for example configured as a shaped lamina) includes a fixing portion 140 attached to the first layer 11 and a shielding portion 3C interposed between the first and second layers 11, 12 of printable material. The shielding portion 3C is conveniently capable of changing its size or shape (for example along a prevalent direction) depending of the values taken by the physical quantity T.

The shielding portion 3C forms the shielding means 3 according to the disclosure.

The shielding portion 3C covers the first region 111 of the first layer 11 of printable material, when the label structure 1 is exposed to a physical quantity T having values lower than the first threshold value TH1.

In this condition, the shielding portion 3C hides the first graphic pattern 101, which cannot therefore be observed.

The shielding portion 3C leaves uncovered the first region 111 of the first layer 11 of printable material, when the label structure 1 is exposed to a physical quantity T having values equal to or higher than the first threshold value TH1.

In this condition, the shielding portion 3C makes visible the first graphic pattern 101, which can therefore be observed in combination with the second graphic pattern 102 (thanks to the circumstance that the second layer 12 is made of a transparent material or it includes the first aperture 121).

Such a combination of graphic patterns is still configured as a code readable through an optical decoding device.

Embodiment #4

Figure 7:
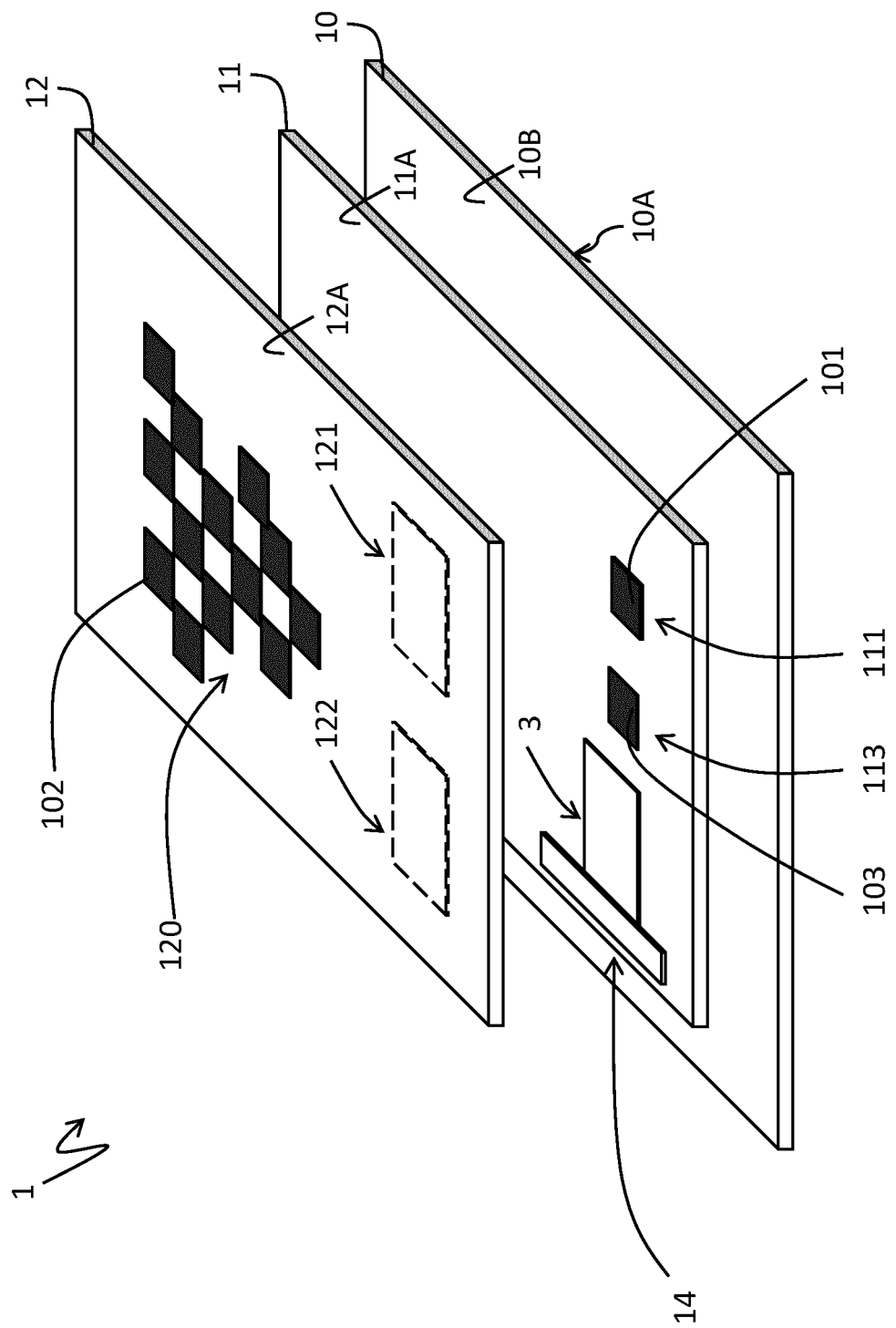

Referring to FIG. 7, the label structure 1, according to an embodiment included in the above-mentioned first family of embodiments of the disclosure, is now described in more details.

According to such an embodiment of the disclosure, the label structure 1 includes the graphic patterns 101, 102, 103 and a stack of overlapped layers on which these graphic patterns and the corresponding shielding means 3 are arranged.

In general, the label structure 1 is configured similarly to the embodiment #2 of the disclosure (FIG. 5).

According to this embodiment of the disclosure, the label structure 1 includes a SMA (Shape Memory Alloy) arrangement 14.

The SMA arrangement (for example configured as a shaped lamina) includes a fixing portion 140 attached to the first layer 11 and a shielding portion 3C interposed between the first and second layers 11, 12 of printable material. The shielding portion 3C is conveniently capable of changing its size or shape (for example along a prevalent direction) depending of the values taken by the physical quantity T.

The shielding portion 3C forms the shielding means 3 according to the disclosure.

The shielding portion 3C covers the first region 111 of the first layer 11 of printable material, when the label structure 1 is exposed to a physical quantity T having values lower than the first threshold value TH1.

In this condition, the shielding portion 3C hides the first graphic pattern 101, which cannot therefore be observed.

The shielding portion 3C covers also the third region 113 of the first layer 11 of printable material, when the label structure 1 is exposed to a physical quantity T having values lower than the second threshold value TH2, higher than the first threshold value TH1.

In this condition, the shielding portion 3C hides the third graphic pattern 103, which cannot therefore be observed.

The shielding portion 3C leaves uncovered the first region 111 of the first layer 11 of printable material, when the label structure 1 is exposed to a physical quantity T having values equal to or higher than the first threshold value TH1.

In this condition, the shielding portion 3C makes visible the first graphic pattern 101, which can therefore be observed in combination with the second graphic pattern 102 (thanks to the circumstance that the second layer 12 is made of a transparent material or it includes the first aperture 121).

Such a combination of graphic patterns is still configured as a code readable through an optical decoding device.

Obviously, in this condition, the shielding portion 3C is still hiding the third graphic pattern 103, which cannot therefore be observed.

The shielding portion 3C leaves uncovered also the third region 113 of the first layer 11 of printable material, when the label structure 1 is exposed to a physical quantity T having values equal to or higher than the second threshold value TH2.

In this condition, the shielding portion 3C makes visible also the third graphic pattern 103, which can therefore be observed in combination with the first and second graphic patterns 101, 102 (thanks to the circumstance that the second layer 12 is made of a transparent material or that the second layer 12 includes the first and second apertures 121 122).

Such a combination of graphic patterns is still configured as a code readable through an optical decoding device.

According to possible variants of the present embodiments (not shown), the label structure 1 may includes two distinct SMA (Shape Memory Alloy) arrangements.

A first SMA arrangement includes a first shielding portion capable of covering or leaving uncovered the first region 111 of the first layer 11 of printable material, thereby hiding or making visible the first graphic pattern 101, depending on the values taken by the physical quantity T.

A second SMA arrangement includes a second shielding portion capable of covering or leaving uncovered the third region 113 of the first layer 11 of printable material, thereby hiding or making visible the third graphic pattern 103, depending on the values taken by the physical quantity T.

SECOND FAMILY OF EMBODIMENTS OF THE DISCLOSURE

According to a second family of embodiments of the disclosure (which will be better described in the following), the shielding means 3 are capable of making visible the first graphic pattern 101, when the label structure 1 is exposed to a physical quantity T having values lower than a first threshold value TH1, and are capable of hiding the first graphic pattern 101, when the label structure 1 is exposed to a physical quantity T having values higher than or equal to the first threshold value TH1.

According to some variants of these embodiments of the disclosure (which will be better described in the following), the label structure 1 includes an additional graphic pattern 103 for providing additional information related to the historical exposure to the physical quantity T.

Also in this case, the label structure 1 may include a third graphic pattern 103 printed on a third portion 113 of the label structure.

The third graphic pattern 103 is conveniently printed on a bi-dimensional surface and it is formed by a matrix of pixels, including a third number N3 of pixels.

The third graphic pattern 103 may be conveniently printed on a printable material by using printing techniques of known type (e.g. digital printing techniques, silkscreen printing techniques, or the like), which will not here described for the sake of brevity.

In general, the third graphic pattern 103 does not form, per se, an optical code readable by an optical decoding device.

In some embodiments, the shielding means 3 are capable of making visible also the third graphic pattern 103, when the label structure is exposed to a physical quantity T having values lower than a second threshold value TH2 higher than the first threshold value TH1, and are capable of hiding the third graphic pattern 103, when the label structure 1 is exposed to a physical quantity T having values higher than or equal to the second threshold value TH2.

In some embodiments, the second and third graphic patterns 102, 103 are arranged in such a way that they can be observed in combination, when the third graphic pattern 103 is made visible by the shielding means 3.

As it will be apparent from the following, according to example embodiments of the disclosure (FIGS. 5 and 7), the second and third graphic patterns 102, 103 may be conveniently printed on overlapped layers 11, 12 of printable material.

In some embodiments, when the first and third graphic patterns 101, 103 are made visible by the shielding means 3, the combination of the first, second and third graphic patterns 101, 102, 103 forms an optical code readable by an optical decoding device which may include a QR-code or a bar-code readable by a traditional optical decoding device.

In some embodiments, also the third number N3 of pixels of the third graphic pattern 103 is correlated to the number N2 of pixels of the second graphic pattern 102.

In particular, the third number N3 of pixels of the third graphic pattern 103 is given by the following relation: $N3 < 0.3 \; N2$, wherein N2 is the number of pixels of the second graphic pattern 102.

The general operation of a label structure 1, according to an embodiment included in the above-mentioned second family of embodiments of the disclosure, is briefly described with reference to FIGS. 8-10.

The label structure 1 is supposed to include a first graphic pattern 101, a second graphic pattern 102 (which is conveniently configured as a QR-code) and a third graphic pattern 103.

The label structure 1 is also supposed to be attached to a product item and to be exposed to a physical quantity T, for example an environmental temperature.

Figure 8:
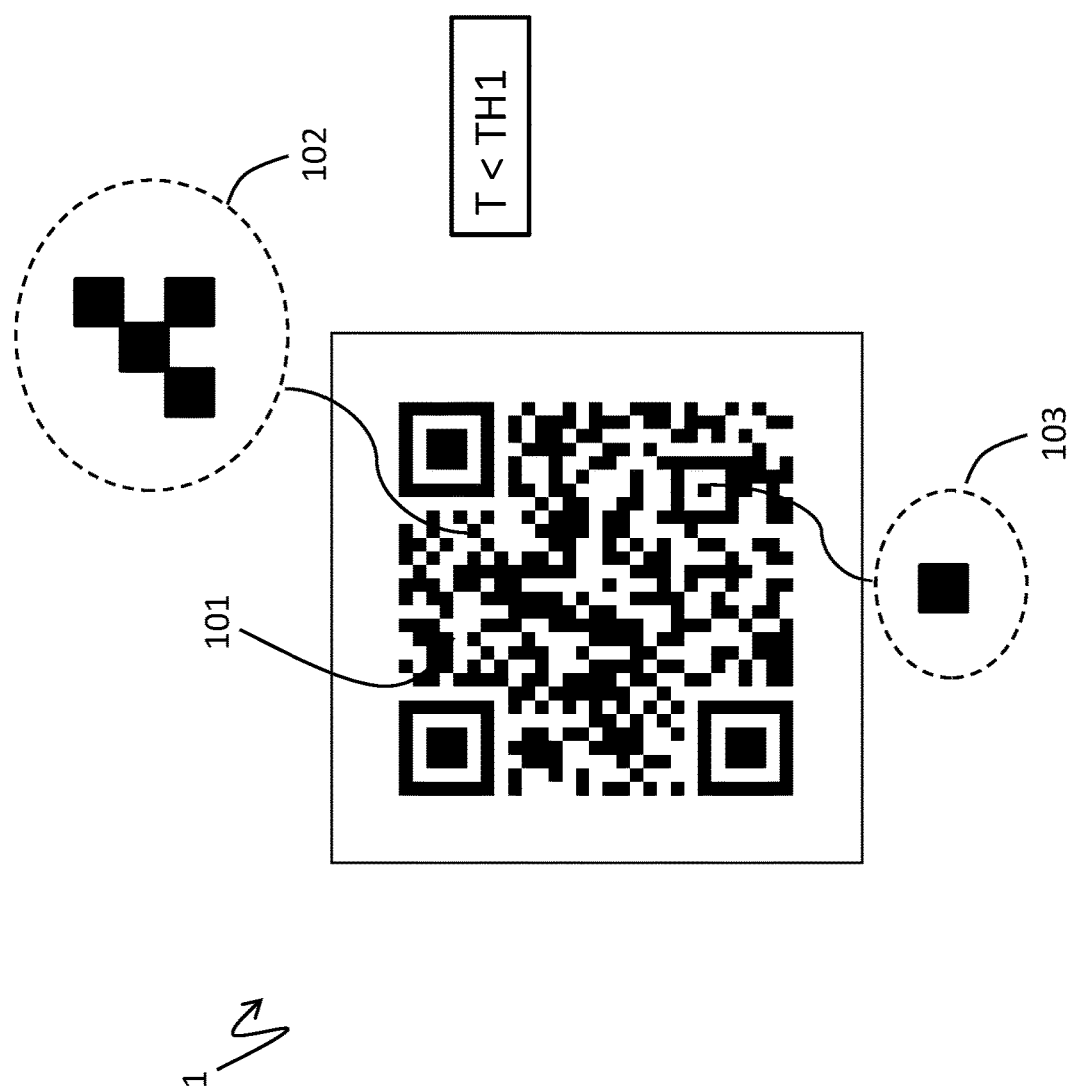
FIGS. 8-10 are schematic views showing operation of a label structure, according to other embodiments of the disclosure.

FIG. 8 shows the operating condition of label structure 1, when the mentioned physical quantity T takes values lower than a first threshold value TH1.

In this case, both the first and third graphic patterns 101, 103 are made visible by the above-mentioned shielding means (not shown).

The combination of the first, second and third graphic patterns 101, 102, 103 can thus be observed. Conveniently, such a combination of graphic patterns is still configured as a QR-code and it can be read through an optical decoding device.

The presence of both the first and third graphic patterns 101, 103 is thus indicative of the circumstance that the physical quantity T, to which the label structure and, consequently, the product item have been exposed, has always taken values lower than the first threshold value TH1.

As it is possible to notice, both the first and third graphic patterns 101, 103 have a number of pixels very smaller than the number of pixels of the second graphic pattern 102.

Figure 9:
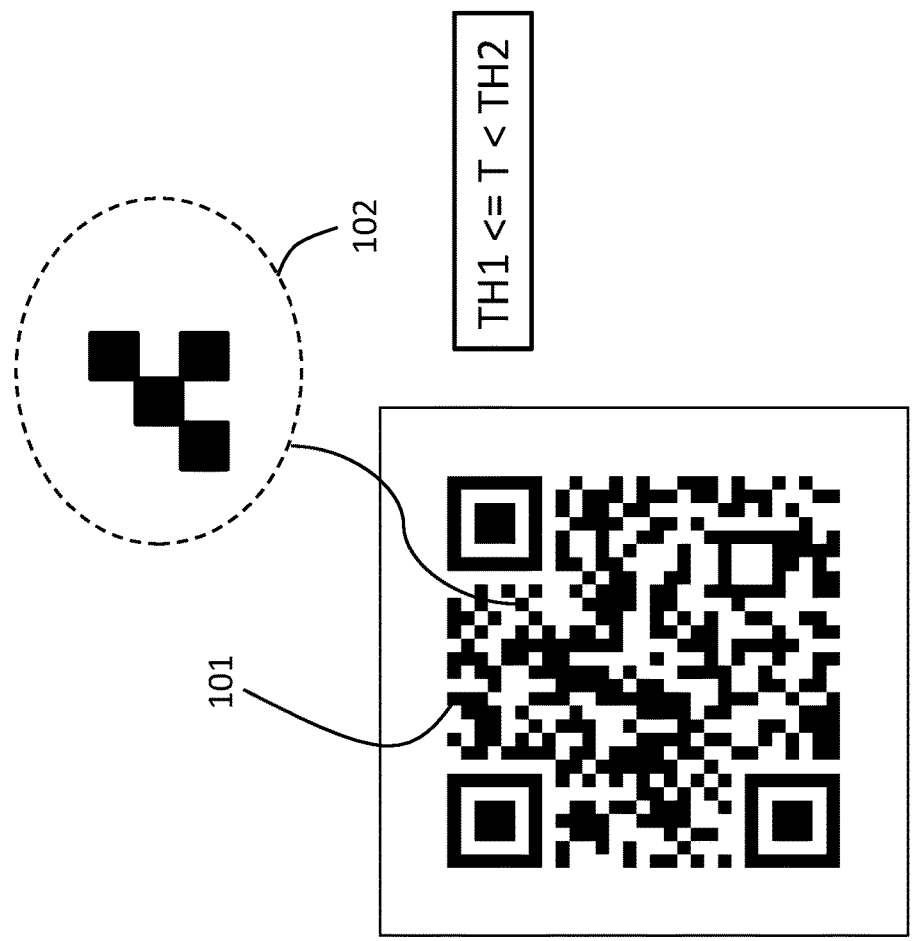

FIG. 9 shows the operating condition of label structure 1, when the mentioned physical quantity T takes values higher or equal than the first threshold value TH1.

In this case, the first graphic pattern 101 is still made visible by the above-mentioned shielding means (not shown) while the third graphic pattern 103 is hidden.

Only the combination of the first and second graphic patterns 101, 102 can now be observed. Conveniently, such a combination of graphic patterns is still configured as a QR-code and it can be read through an optical decoding device.

The presence of the first graphic pattern 101 is thus indicative of the circumstance that the physical quantity T, to which the label structure and, consequently, the product item have been exposed, has taken at least once values higher than or equal to the first threshold value TH1.

On the other hand, the absence of the third graphic pattern 103 is indicative of the circumstance that the physical quantity T, to which the label structure and, consequently, the product item have been exposed, has always taken values lower than the second threshold value TH2.

Figure 10:
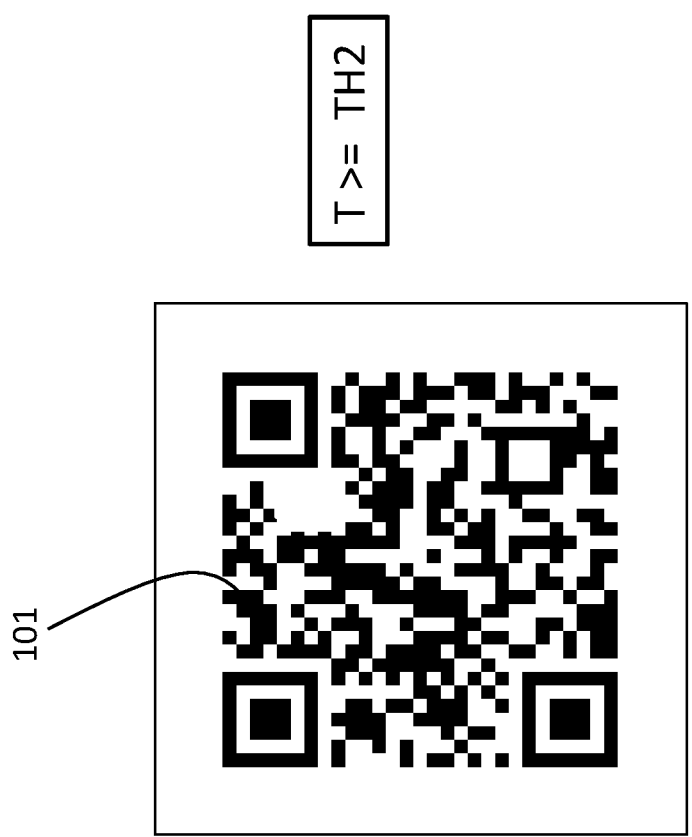

FIG. 10 shows the operating condition of label structure 1, when the mentioned physical quantity T takes values higher or equal than a second threshold value TH2, with TH2>TH1.

In this case, both the first and third graphic patterns 101, 103 are hidden by the above-mentioned shielding means (not shown). Thus, only the second graphic pattern 102 can be observed and possibly read through an optical decoding device.

The absence of the first and third graphic patterns 101, 103 is thus indicative of the circumstance that the physical quantity T, to which the product item has been exposed, has taken at least once values higher than the second threshold value TH2.

Embodiment #5

A label structure, according to an embodiment included in the above-mentioned second family of embodiments of the disclosure, is now described in more details.

The label structure 1 has substantially a general structure substantially similar to the embodiment #1 of FIG. 4.

In this case, however, the label structure 1 includes a first shielding material 3A that behaves in an opposite way with respect to the embodiment #1 of FIG. 4.

Conveniently, the first shielding material 3A takes a transparency condition (e.g. to the visible light), when the label structure 1 is exposed to a physical quantity T (for example an environmental temperature) having values lower than a first threshold value TH1.

When it takes such a transparency condition, the first shielding material 3A makes visible the first graphic pattern 101, which can therefore be observed.

Thanks to the circumstance that the second layer 12 is made of a transparent material or that the second layer 12 includes the first aperture 121, the combination of the first and second graphic patterns 101, 102 can now be observed.

Such a combination of graphic patterns is still configured as a code readable through an optical decoding device.

Conveniently, the first shielding material 3A takes an opacity condition (e.g. to the visible light), when the label structure 1 is exposed to a physical quantity T (for example an environmental temperature) having values equal to or higher than the first threshold value TH1.

When it takes such an opacity condition, the first shielding material 3A hides the first graphic pattern 101, which cannot therefore be observed.

Embodiment #6

A label structure, according to an embodiment included in the above-mentioned second family of embodiments of the disclosure, is now described in more details.

The label structure 1 has substantially a general structure substantially similar to the embodiment #2 of FIG. 5.

In this case, however, the label structure 1 includes a first shielding material 3A and a second shielding material 3B that behave in an opposite way with respect to the embodiment #2 of FIG. 5.

The first shielding material 3A takes a transparency condition (e.g. to the visible light), when the label structure 1 is exposed to a physical quantity T (for example an environmental temperature) having values lower than a first threshold value TH1, and it takes an opacity condition, when the label structure 1 is exposed to a physical quantity T having values equal to or higher than the first threshold value TH1.

The second shielding material 3B takes a transparency condition (e.g. to the visible light), when the label structure 1 is exposed to a physical quantity T (for example an environmental temperature) having values lower than a second threshold value TH2 (higher than the first threshold value TH1), and it takes an opacity condition, when the label structure 1 is exposed to a physical quantity T having values equal to or higher than the second threshold value TH2.

When both the first and second shielding materials 3A, 3B take a transparency condition, the first, second and this graphic patterns 101, 102, 103 may be observed in combination.

Such a combination of graphic patterns is still configured as a code readable through an optical decoding device.

When only the first shielding material 3A takes a transparency condition, the first and second graphic patterns 101, 102 may be observed in combination whereas the third graphic pattern 103 cannot be observed.

Such a combination of graphic patterns is still configured as a code readable through an optical decoding device.

When both the first and second shielding materials 3A, 3B take an opacity condition, only the second graphic pattern 102 may be observed.

Embodiment #7

A label structure, according to an embodiment included in the above-mentioned second family of embodiments of the disclosure, is now described in more details.

The label structure 1 has a general structure substantially similar to the embodiment #3 of FIG. 6.

In this case, however, the label structure 1 includes a SMA arrangement 14 having a shielding portion 3C behaving in an opposite way with respect to the embodiment #3 of FIG. 6.

The shielding portion 3C leaves uncovered the first region 111 of the first layer 11 of printable material, when the label structure 1 is exposed to a physical quantity T having values lower than the first threshold value TH1.

In this condition, the shielding portion 3C makes visible the first graphic pattern 101, which can therefore be observed in combination with the second graphic pattern 102 (thanks to the circumstance that the second layer 12 is made of a transparent material or it includes the first aperture 121).

Such a combination of graphic patterns is still configured as a code readable through an optical decoding device.

The shielding portion 3C covers the first region 111 of the first layer 11 of printable material, when the label structure 1 is exposed to a physical quantity T having values equal to or higher than the first threshold value TH1.

In this condition, the shielding portion 3C hides the first graphic pattern 101, which cannot therefore be observed.

Embodiment #8

A label structure, according to an embodiment included in the above-mentioned second family of embodiments of the disclosure, is now described in more details.

The label structure 1 has a general structure substantially similar to the embodiment #4 of FIG. 7.

In this case, however, the label structure 1 includes a SMA arrangement 14 having a shielding portion 3C behaving in an opposite way with respect to the embodiment #4 of FIG. 7.

The shielding portion 3C leaves uncovered the first region 111 of the first layer 11 of printable material, when the label structure 1 is exposed to a physical quantity T having values lower than the first threshold value TH1, and it covers the first region 111 of the first layer 11 of printable material, when the label structure 1 is exposed to a physical quantity T having values equal to or higher than the first threshold value TH1.

The shielding portion 3C leaves uncovered the third region 113 of the first layer 11 of printable material, when the label structure 1 is exposed to a physical quantity T having values lower than the second threshold value TH2 (higher than the first threshold value TH1), and it covers the third region 113 of the first layer 11 of printable material, when the label structure 1 is exposed to a physical quantity T having values equal to or higher than the second threshold value TH2.

When the shielding portion 3C leaves uncovered both the first and third graphic patterns 101 and 103, the first, second and third graphic patterns 101, 102, 103 may be observed in combination.

Such a combination of graphic patterns is still configured as a code readable through an optical decoding device.

When the shielding portion 3C leaves uncovered only the first graphic pattern 101, the first and second graphic patterns 101, 102 may be observed in combination whereas the third graphic pattern 103 cannot be observed.

Such a combination of graphic patterns is still configured as a code readable through an optical decoding device.

When the shielding portion 3C covers both the first and third graphic patterns 101 and 103, only the second graphic pattern 102 may be observed.

According to possible variants of the present embodiments (not shown), the label structure 1 may includes two distinct SMA (Shape Memory Alloy) arrangements.

A first SMA arrangement includes a first shielding portion capable of covering or leaving uncovered the first region 111 of the first layer 11 of printable material, thereby hiding or making visible the first graphic pattern 101, depending on the values taken by the physical quantity T.

A second SMA arrangement includes a second shielding portion capable of covering or leaving uncovered the third region 113 of the first layer 11 of printable material, thereby hiding or making visible the third graphic pattern 103, depending on the values taken by the physical quantity T.

The present disclosure provides remarkable advantages with respect to known solutions of the state of the art.

The label structure, according to the disclosure, allows an easy automatic acquisition of information related to the possible exposure to a given physical quantity T. Such an information may in fact be acquired similarly to and together with other standard information related to the product item by using an optical code reading process, such as a QR-code reading process.

The label structure, according to the disclosure, can thus be directly interfaced with computerized arrangements capable of processing the information provided by the above-mentioned graphic patterns 101, 102 and, possibly, 103.

The label structure, according to the disclosure, is thus characterised by a remarkable easiness and reliability of use.

On the other hand, the label structure, according to the disclosure, allows implementing a selective access to the information related to the possible exposure to a given physical quantity T, which makes it particularly adapted for use by equipment suppliers.

When they are made visible, graphic patterns (the first graphic pattern 101 and, possibly, the third graphic pattern 103) providing information about the exposure history to a physical quantity are in fact configured in such a way that they can be distinguished from a graphic pattern reporting standard information (the graphic pattern 102 forming, per se, a readable code, e.g. a QR-code) only by using an optical decoding device provided with a suitable image recognition tool.

The label structure, according to the disclosure, can be easily applied (for example attached) to the surface, package or casing of a product item or to a cabinet or container including a variety of product items.

The label structure, according to the disclosure, is thus particularly useful for tagging a variety of products (e.g. consumer products, packages, and the like), in particular in electric products to be used in electric power distribution grids or other electric systems, for example the cabinet of an electric switchgear.

The switching apparatus 1, according to the disclosure, is of relatively easy and cheap industrial production as it may be manufactured with standard printing techniques.

The invention claimed is:

1. A label structure for tagging a product item, the label structure comprising:
  a first graphic pattern having a first number (N1) of pixels and printed on a first portion of said label structure, wherein the first graphic pattern by itself does not form an optical code readable by an optical decoding device;
  a second graphic pattern having a second number (N2) of pixels and printed on a second portion of said label structure, said second graphic pattern forming the optical code readable by the optical decoding device; and
  a shielding means capable of hiding or making visible said first graphic pattern depending on values taken by a physical quantity to which said label structure is exposed;
  wherein said first and second graphic patterns can be observed in combination, when said first graphic pattern is made visible by said shielding means;
  wherein the combination of said first and second graphic patterns forms an optical code readable by the optical decoding device, when said first graphic pattern is made visible by said shielding means;

wherein the combination of the first graphic pattern and the second graphic pattern is indistinguishable from the second graphic pattern when being read by the optical decoding device.

2. The label structure according to claim 1, wherein the first number (N1) of pixels of said first graphic pattern is given by the following relation: N1<0.3 N2, such that the combination of the first graphic pattern and the second graphic pattern is indistinguishable from the second graphic pattern when being read through the optical decoding device.

3. The label structure according to claim 2, wherein said shielding means are capable of making visible said first graphic pattern, when said label structure is exposed to the physical quantity having values lower than a first threshold value, and are capable of hiding said first graphic pattern, when said label structure is exposed to the physical quantity having values higher than or equal to the first threshold value.

4. The label structure according to claim 3 further comprising:
a third graphic pattern having a third number (N3) of pixels and printed on a third portion of said label structure;
wherein said shielding means are capable of making visible said third graphic pattern, when said label structure is exposed to the physical quantity having values lower than a second threshold value higher than the first threshold value, and are capable of hiding said third graphic pattern when said label structure is exposed to the physical quantity having values higher than or equal to the second threshold value,
wherein said first, second and third graphic patterns can be observed in combination, when said first and third graphic patterns are made visible by said shielding means;
wherein the combination of said first, second and third graphic patterns forms an optical code readable by the optical decoding device, when said first and third graphic patterns are made visible by said shielding means;
wherein the third number (N3) of pixels of said third graphic pattern is given by the following relation: N3<0.3 N2.

5. The label structure according to claim 4 further comprising:
a first layer of printable material including a first region on which said first graphic pattern is printed; and
a second layer of printable material including a second region, on which said second graphic pattern is printed, said second layer of printable material being overlapped with said first layer of printable material and being made of a transparent material or including a first opening overlapped with the first region of said first layer of printable material, on which said first graphic pattern is printed;
wherein said shielding means comprise a first shielding material interposed between said first and second layers of printable material and covering the first region of said first layer of printable material on which said first graphic pattern is printed,
wherein the first shielding material takes a transparency condition, thereby making visible said first graphic pattern, when said label structure is exposed to the physical quantity having values lower than a first threshold value, and takes an opacity condition, thereby hiding said first graphic pattern, when said label structure is exposed to the physical quantity having values higher than or equal to the first threshold value.

6. The label structure according to claim 5, wherein said first layer of printable material comprises also a third region, on which said third graphic pattern is printed, said second layer of printable material being overlapped with said first layer of printable material and being made of a transparent material or including also a second opening overlapped with the third region of said first layer of printable material, on which said third graphic pattern is printed,
wherein said shielding means comprise a second shielding material interposed between said first and second layers of printable material and covering the second region of said first layer of printable material on which said third graphic pattern is printed,
wherein the second shielding material takes a transparency condition, thereby making visible said third graphic pattern, when said label structure is exposed to the physical quantity having values lower than the second threshold value, and takes an opacity condition, thereby hiding said third graphic pattern, when said label structure is exposed to said physical quantity having values higher than or equal to the second threshold value.

7. The label structure according to claim 4 further comprising:
a first layer of printable material including a first region on which said first graphic pattern is printed;
a second layer of printable material including a second region, on which said second graphic pattern is printed, said second layer of printable material being overlapped with said first layer of printable material and being made of a transparent material or including a first opening overlapped with the first region of said first layer of printable material, on which said first graphic pattern is printed; and
at least a SMA arrangement including at least one shielding portion interposed between said first and second layers of printable material and having a size or shape changeable depending on the values taken by the physical quantity;
wherein said shielding means comprise the at least one shielding portion;
wherein the at least one shielding portion leaves uncovered the first region of said first layer of printable material, thereby making visible said first graphic pattern, when said label structure is exposed to the physical quantity having values lower than the first threshold value, and covers the first region of said first layer of printable material, thereby hiding said first graphic pattern, when said label structure is exposed to the physical quantity having values higher than or equal to the first threshold value.

8. The label structure according to claim 7, wherein said first layer of printable material comprises also a third region, on which said third graphic pattern is printed, said second layer of printable material being overlapped with said first layer of printable material and being made of a transparent material or including also a second opening overlapped with the third region of said first layer of printable material, on which said third graphic pattern is printed,
wherein the at least one shielding portion leaves uncovered the third region of said first layer of printable material, thereby making visible said third graphic pattern, when said label structure is exposed to the physical quantity having values lower than the second threshold value, and covers the third region of said first layer of printable material, thereby hiding said third graphic pattern, when said label structure is exposed to the physical quantity having values higher than or equal to the second threshold value.

9. The label structure according to claim 4, wherein the combination of said first, second and third graphic patterns is configured as a QR-code or a bar-code, when said first and third graphic patterns are made visible by said shielding means.

10. The label structure according to claim 1, wherein said shielding means are capable of hiding said first graphic pattern, when said label structure is exposed to the physical quantity having values lower than a first threshold value, and are capable of making visible said first graphic pattern, when said label structure is exposed to the physical quantity having values higher than or equal to the first threshold value.

11. The label structure according to claim 10 further comprising a third graphic pattern having a third number (N3) of pixels and printed on a third portion of said label structure,
wherein said shielding means are capable of hiding said third graphic pattern, when said label structure is exposed to the physical quantity having values lower than a second threshold value higher than the first threshold value, and are capable of making visible said third graphic pattern when said label structure is exposed to the physical quantity having values higher than or equal to the second threshold value,
wherein said first, second and third graphic patterns can be observed in combination, when said first and third graphic patterns are made visible by said shielding means;
wherein the combination of said first, second and third graphic patterns forms an optical code readable by the optical decoding device, when said first and third graphic patterns are made visible by said shielding means;
wherein the third number (N3) of pixels of said third graphic pattern is given by the following relation: N3<0.3 N2.

12. The label structure according to claim 11 further comprising:
a first layer of printable material including a first region on which said first graphic pattern is printed; and
a second layer of printable material including a second region, on which said second graphic pattern is printed, said second layer of printable material being overlapped with said first layer of printable material, said second layer of printable material being made of a transparent material or including a first opening overlapped with the first region of said first layer of printable material, on which said first graphic pattern is printed;
wherein said shielding means comprise a first shielding material interposed between said first and second layers of printable material and covering the first region of said first layer of printable material on which said first graphic pattern is printed,
wherein the first shielding material takes an opacity condition, thereby hiding said first graphic pattern, when said label structure is exposed to the physical quantity having values lower than a first threshold value, and takes a transparency condition, thereby making visible said first graphic pattern, when said label structure is exposed to the physical quantity having values higher than or equal to the first threshold value.

13. The label structure according to claim 12, wherein said first layer of printable material comprises also a third region, on which said third graphic pattern is printed, said second layer of printable material being overlapped with said first layer of printable material and being made of a transparent material or including also a second opening overlapped with the third region of said first layer of printable material, on which said third graphic pattern is printed,
wherein said shielding means comprise also a second shielding material interposed between said first and second layers of printable material and covering the second region of said first layer of printable material on which said third graphic pattern is printed,
wherein the second shielding material takes an opacity condition, thereby hiding said third graphic pattern, when said label structure is exposed to the physical quantity having values lower than the second threshold value, and takes a transparency condition, thereby making visible said third graphic pattern, when said label structure is exposed to the physical quantity having values higher than or equal to the second threshold value.

14. The label structure according to claim 10, wherein the physical quantity is an environmental temperature.

15. The label structure according to claim 11 further comprising:
a first layer of printable material including a first region on which said first graphic pattern is printed;
a second layer of printable material including a second region, on which said second graphic pattern is printed, said second layer of printable material being overlapped with said first layer of printable material and being made of a transparent material or including a first opening overlapped with the first region of said first layer of printable material, on which said first graphic pattern is printed; and
at least a SMA arrangement including at least one shielding portion interposed between said first and second layers of printable material and having a size or shape changeable depending on values taken by the physical quantity;
wherein said shielding means comprise the at least one shielding portion;
wherein the at least one shielding portion covers the first region of said first layer of printable material, thereby hiding said first graphic pattern, when said label structure is exposed to said physical quantity having values lower than the first threshold value, and leaves uncovered the first region of said first layer of printable material, thereby making visible said first graphic pattern, when said label structure is exposed to the physical quantity having values higher than or equal to the first threshold value.

16. The label structure according to claim 15, wherein said first layer of printable material comprises also a third region, on which said third graphic pattern is printed, said second layer of printable material being overlapped with said first layer of printable material and being made of a transparent material or including also a second opening overlapped with the third region of said first layer of printable material, on which said third graphic pattern is printed, wherein the at least one shielding portion covers the third region of said first layer of printable material, thereby hiding said third graphic pattern, when said label structure is exposed to said physical quantity having values lower than the second threshold value, and leaves uncovered the third region of said first layer of printable material, thereby making visible said third graphic pattern, when said label structure is exposed to the physical quantity having values higher than or equal to the second threshold value.

17. The label structure according to claim 1, wherein said second graphic pattern is configured as a QR-code or a bar-code.

18. The label structure according to claim 1, wherein the combination of said first and second graphic pattern is configured as a QR-code or a bar-code, when said first graphic pattern is made visible by said shielding means.

19. An electric product item comprising a label structure according to claim 1.

* * * * *